W. LIVTSCHAK.
HARVESTING MACHINE.
APPLICATION FILED MAY 23, 1908.

908,873.

Patented Jan. 5, 1909.

2 SHEETS—SHEET 1.

Fig. 1.

Witnesses
W. Köhler
W. Harrison

Inventor
Wladimir Livtschak
By Munn & Co.
Attorneys

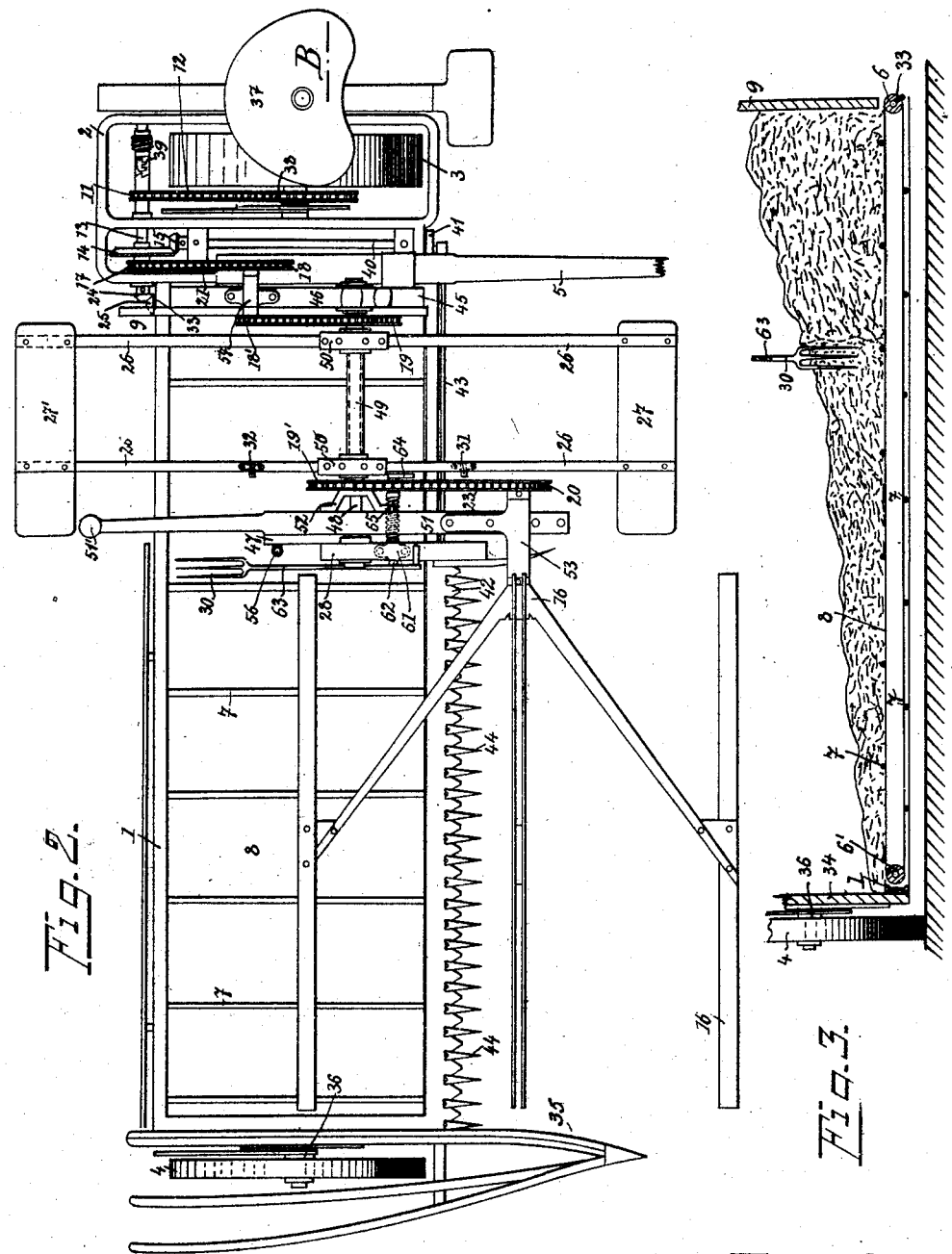

UNITED STATES PATENT OFFICE.

WLADIMIR LIVTSCHAK, OF ST. PETERSBURG, RUSSIA.

HARVESTING-MACHINE.

No. 908,873.  Specification of Letters Patent.  Patented Jan. 5, 1909.

Application filed May 23, 1908. Serial No. 434,610.

*To all whom it may concern:*

Be it known that I, WLADIMIR LIVTSCHAK, a subject of the Emperor of Russia, residing at St. Petersburg, in the Empire of Russia, have invented a new and useful Harvesting-Machine, of which the following is a specification.

My invention relates to improvements in harvesting machines, whereby it is rendered possible to heap or pile the cut crop in a space on the frame between the main wheel and the finger bar and to discharge same in definite heaps upon the ground so that free space is left for the path of the draft animals, and the subsequent binding up into sheaves by hand is facilitated.

I will now proceed to describe my invention with reference to the accompanying drawings, in which—

Figure 1 is a side view of my harvesting machine, the driver's seat being omitted, Fig. 2 is a plan of the same including the driver's seat, and Fig. 3 is a vertical section through a part of the machine on the line A—B in Fig. 2.

Similar characters of reference refer to similar parts throughout the several views.

I divide the frame work into two frames 1 and 2, which are rigidly connected together in the same horizontal plane by means of suitable screws and nuts or their equivalents. The framework so formed is supported by two wheels 3 and 4 on opposite sides as will be hereinafter described. The frame 1 is made long and rectangular and comprises an endless apron 8 of sail-cloth or the like, which is strengthened with cross bars 7, 7 and passes over two rollers 6 and $6^1$. The one roller $6^1$ is journaled in suitable bearings (not shown), which in any known manner can be horizontally adjusted on the frame 1 for taking up any slack of the apron 8. The other roller 6 is fastened on a shaft 33, which is mounted in the frame 1 to turn and is driven from a shaft 13 to be hereinafter described, by means of bevel wheels 24 and 25. Above the roller 6 a vertical board 9 is secured on the frame 1 and another vertical board 34 is secured on the opposite side of the frame 1. This board 34 is not visible in Fig. 2, as it is hidden by the ordinary divider-shoe 35 of any known construction. On the board 34 is fastened a pin 36, on which the lateral wheel 4 is mounted to turn. The frame 2 is arranged for containing the main wheel 3 and is made narrow so as to compensate for the excess in length of the frame 1. The ordinary driver's seat 37 is attached to the frame 2 in any known and approved manner. The shaft 38 of the main wheel 3 has fastened on it a large chain wheel 10 which is arranged to drive by means of an endless chain 12 a small chain wheel 11 loose on the above mentioned shaft 13. The latter is mounted in the frame 2 to turn and can be coupled at will with the chain wheel 11 by means of a clutch 39 of any known construction. The shaft 13 drives by means of bevel wheels 14 and 15 a shaft 40 with a crank disk 41 for reciprocating the knife bar 42 with the aid of a connecting rod 43. On the front side of the frame 1 is fastened a finger bar with the fingers 44, 44, in which the knife bar 42 is guided as usual. The finger bar extends over only the larger part of the front side of the frame 1, so that there is left a space between it and the vertical board 9.

On the frame 1 are fastened two crossing studs 45 and 46 to which the pole 5 is attached in any known manner. On the front side of the frame 1 is fastened an inclined stud 28, on which a metallic segment 47 is fastened. A horizontal shaft 48 is fastened in the crossing point of the two studs 45 and 46 and in the inclined stud 28, and on this shaft 48 a sleeve 49 is mounted to turn. This sleeve carries at its ends two chain wheels 19 and $19^1$ and near them two cast pieces 50, 50, on which two parallel long arms 26, 26 are fastened. These arms carry on their ends two blades 27 and $27^1$ and form a discharger as will be hereinafter explained. A beam 51, $51^1$ with a bracket 52 on its middle is mounted on the shaft 48 to rock and carries on its arm 51 a suitable bearing 53 for the shaft 54 of a reel 16 of any known construction. The segment 47 is provided with several holes 55, 55, through any one of which a pin 56 can be introduced for engaging in a hole or recess in the arm $51^1$. By turning the arm $51^1$ up or down the reel 16 can be lowered or raised in accordance with the height of the crop, after which the reel 16 can be secured in its position by means of the pin 56. On the stud 46 is fastened a suitable bearing 57 for a shaft 58 carrying a large chain wheel 18 and a small chain wheel $18^1$. On the shaft 13 is fastened a small chain wheel 17, which is connected with a large chain wheel 18 by an endless chain 21, while the small chain wheel 18¹ is connected with the large chain wheel 19 by an endless chain 22. In this manner the discharger can be put in a slow rotation in the direction of the arrow 59 in Fig. 1 from the driving shaft 13. As the large chain wheel 19¹ is connected by an endless chain 23 with a smaller chain wheel 20 fastened on the shaft 54 of the reel 16, the reel 16 can be at the same time set to rotate at a larger speed in the direction of the arrow 60 in Fig. 1. On the inclined stud 28 is fastened a bearing 61 for a rocking shaft 62, which carries two arms 63 and 64. A helical spring 65 surrounding the shaft 62 and attached with its one end to the bearing 61 and with its other end to the arm 64 tends to press the two arms 63 and 64 into their normal position shown in full lines in Fig. 1, so that the arm 63 is approximately horizontal. This arm 63 is provided on its free end with a bent fork 30 and serves as a detainer as will be presently explained. The other arm 64 engages in the path (marked by a dotted circle 66 in Fig. 1) of two fingers 31 and 32 fastened on one arm 26.

The machine is shown as provided with a device for raising and lowering at will the combined frames 1 and 2 in accordance with the desired height of the stubble. However, I do not further describe this device as it is old and is immaterial to my invention, also it may be of any other known construction.

The harvesting machine operates as follows: After putting the animal or animals to the pole 5 the machine is driven to the starting point of a field, whereupon the driver engages the clutch 39 in any known manner for putting the driving shaft 13 in rotation. The reel 16 will incline the stalks of the crop and the knife bar 42 will cut the crop. The cut stalks falling on the endless apron 8 will be moved by the latter from right to left (when looking forward in the direction in which the animal or animals go on), that is, toward the right in Fig. 3, so that the material accumulates deepest where it rests against the board 9. On either finger 31 or 32 of the discharger striking the arm 64 the detainer 63 will be lowered, so that its fork 30 will engage in the heap of stalks (see Fig. 3) and detain the cut crop behind the knife bar 42, in other words, it will prevent them from further moving with the apron 8 and thus permit the pile formed to separate. The respective blade 27 or 27¹ of the discharger will then strike the lower ends of the accumulated stalks and thereby move the pile rearwards. On the finger 31 or 32 leaving the arm 64 (which with the detainer 63 at this moment occupies a position indicated by dotted lines in Fig. 1), the detainer 63 under the action of the helical spring 65 will recoil to its initial position so that it is withdrawn from the crop. At this moment or shortly afterwards the discharger will have discharged the heap or pile of crop to the ground, and the apron 8 will continue moving the cut crop towards the board 9.

From an examination of Fig. 2 it will be clear that the discharged heaps or piles of crop are in a line at a distance from the uncut crop, which distance is ample for giving free way to the animal or animals in their next turn. The binding up of the heaps or piles into sheaves by hand is also greatly facilitated.

I am aware that it is old in mowing and reaping or harvesting machines to employ endless aprons running in a direction at right angles to the direction in which the animal or animals draws or draw the machine, but such machines have all so far failed to work satisfactorily, chiefly for the reason, that the length of the apron, that is the distance of its two driving rollers, is approximately like the length of the knife or finger bar, in other words like the breadth of the strip of the field in which the crop is being cut. In opposition to such known machines I make the endless apron longer, about like the breadth of the strip in which the crop is being cut plus about one third of same, so that the heaps or piles of cut crop are periodically discharged on a strip of surface which adjoins the said strip of the field, and I dispose the special discharger (which forms the chief feature of my invention) in the space on the frame 1 between the finger bar and the vertical board 9, in other words above the strip of surface on which the heaps or piles are to be deposited. In accordance with this I reduce the usual breadth of the frame destined in ordinary machines for the main wheel and the driving gear and I employ the narrow frame 2 described above.

The spring-pressed detainer 63 forms another feature of my invention and serves for facilitating the periodic discharge of the several heaps or piles formed.

The machine may be varied in many respects without departing from the spirit of my invention.

I claim:

1. In a harvesting machine, the combination with a frame, of a main wheel supporting one side of said frame, a lateral wheel supporting the opposite side of said frame, a pole attached to said frame near said main wheel, a vertical board on said frame near said main wheel and parallel to same, a finger bar extending over the larger part of the front side of said frame while leaving a space between it and said vertical board, a knife bar, an endless apron within said frame and adapted to convey the cut crop along said finger bar to said vertical board while permitting it to there accumulate, a discharger located above said frame between said vertical board and said finger bar for periodically discharging rearwards the piles formed, and means for transmitting the movement from said main wheel to said knife bar, said endless apron and said discharger.

2. In a harvesting machine, the combination with a frame, of a main wheel supporting one side of said frame, a lateral wheel supporting the opposite side of said frame, a pole attached to said frame near said main wheel, a vertical board on said frame near said main wheel and parallel to same, a finger bar extending over the larger part of the front side of said frame while leaving a space between it and said vertical board, a knife bar, an endless apron within said frame and adapted to convey the cut crop along said finger bar to said vertical board while permitting it to there accumulate, a rotatory discharger located above said frame between said vertical board and said finger bar for periodically discharging rearwards the piles formed, means controlled from said discharger for periodically dividing the pile formed from the remaining stalks, and means for transmitting the movement from said main wheel to said knife bar, said endless apron, and said rotatory discharger.

3. In a harvesting machine, the combination with a frame, of a main wheel supporting one side of said frame, a lateral wheel supporting the opposite side of said frame, a pole attached to said frame near said main wheel, a vertical board on said frame near said main wheel, and parallel to same, a finger bar extending over the larger part of the front side of said frame while leaving a space between it and said vertical board, a knife bar, an endless apron within said frame and adapted to convey the cut crop along said finger bar to said vertical board while permitting it to there accumulate, a support on said frame, a discharger mounted on said support to turn around a horizontal axis between said vertical board and said finger bar and comprising blades adapted to periodically discharge rearwards the piles formed, and means for transmitting the movement from said main wheel to said knife bar, said endless apron and said discharger.

4. In a harvesting machine, the combination with a frame, of a main wheel supporting one side of said frame, a lateral wheel supporting the opposite side of said frame, a pole attached to said frame near said main wheel, a vertical board on said frame near said main wheel and parallel to same, a finger bar extending over the larger part of the front side of said frame while leaving a space between it and said vertical board, a knife bar, an endless apron within said frame and adapted to convey the cut crop along said finger bar to said vertical board while permitting it to there accumulate, a support on said frame, a discharger mounted on said support to turn around a horizontal axis between said vertical board and said finger bar and comprising blades adapted to periodically discharge rearwards the piles formed, a spring-pressed detainer mounted on said support to rock and being normally about horizontal, it being adapted to be periodically operated by said discharger for engaging in the cut crop and permitting the pile formed to separate, and means for transmitting the movement from said main wheel to said knife bar, said endless apron and said discharger.

5. In a harvesting machine, the combination with a rectangular frame, of a draft frame rigidly connected with said rectangular frame, a vertical board on said rectangular frame near said draft frame, a main wheel supporting said draft frame, a lateral wheel supporting said rectangular frame on its end opposite to that near said main wheel, a finger bar extending on the larger part of the front side of said rectangular frame while leaving a space between it and said vertical board, a knife bar, an endless apron within said rectangular frame and adapted to convey the cut crop along said finger bar to said vertical board while permitting it to there accumulate, a discharger located above said rectangular frame between said vertical board and said finger bar for periodically discharging rearwards the piles formed, and means for transmitting the movement from said main wheel to said knife bar, said endless apron and said discharger.

6. In a harvesting machine, the combination with a rectangular frame, of a draft frame rigidly connected with said rectangular frame, a vertical board on said rectangular frame near said draft frame, a main wheel supporting said draft frame, a lateral wheel supporting said rectangular frame on its end opposite to that near said main wheel, a finger bar extending over the larger part of the front side of said rectangular frame while leaving a space between it and said vertical board, a knife bar, an endless apron within said rectangular frame and adapted to convey the cut crop along said finger bar to said vertical board while permitting it to there accumulate, a rotatory discharger located above said rectangular frame between said vertical board and said finger bar for periodically discharging rearwards the piles formed, means controlled from said discharger for dividing the pile formed from the remaining stalks, and means for transmitting the movement from said main wheel to said knife bar, said endless apron, and said rotatory discharger.

7. In a harvesting machine, the combination with a rectangular frame, of a draft frame rigidly connected with said rectangular frame, a vertical board on said rectangular frame near said draft frame, a main wheel supporting said draft frame, a lateral wheel supporting said rectangular frame on its end opposite to that near said main wheel, a finger bar extending over the larger part of the front side of said rectangular frame while leaving a space between it and said vertical board, a knife bar, an endless apron within said rectangular frame and adapted to convey the cut crop along said finger bar to said vertical board while permitting it to there accumulate, a support on said rectangular frame, a discharger mounted on said support to turn around a horizontal axis between said vertical board and said finger bar and comprising ladles adapted to periodically discharge rearwards the piles formed, and means for transmitting the movement from said main wheel to said knife bar, said endless apron and said discharger.

8. In a harvesting machine, the combination with a rectangular frame, of a draft frame rigidly connected with said rectangular frame, a vertical board on said rectangular frame near said draft frame, a main wheel supporting said draft frame, a lateral wheel supporting said rectangular frame on its end opposite to that near said main wheel, a finger bar extending over the larger part of the front side of said rectangular frame while leaving a space between it and said vertical board, a knife bar, an endless apron within said frame and adapted to convey the cut crop along said finger bar to said vertical board while permitting it to there accumulate, a support on said frame, a discharger mounted on said support to turn around a horizontal axis between said vertical board and said finger bar and comprising ladles adapted to periodically discharge rearwards the piles formed, a spring-pressed detainer mounted on said support to rock and being normally about horizontal, it being adapted to be periodically operated by said discharger for engaging in the cut crop and permitting the pile formed to separate, and means for transmitting the movement from said main wheel to said knife bar, said endless apron and said discharger.

WLADIMIR LIVTSCHAK.

Witnesses:
 CARL OTTE,
 WILLY KÖHLER.